Dec. 13, 1960 J. W. GARDNER 2,964,080
MACHINE FOR BLANCHING PEANUTS AND THE LIKE
Filed Feb. 17, 1958 4 Sheets-Sheet 1
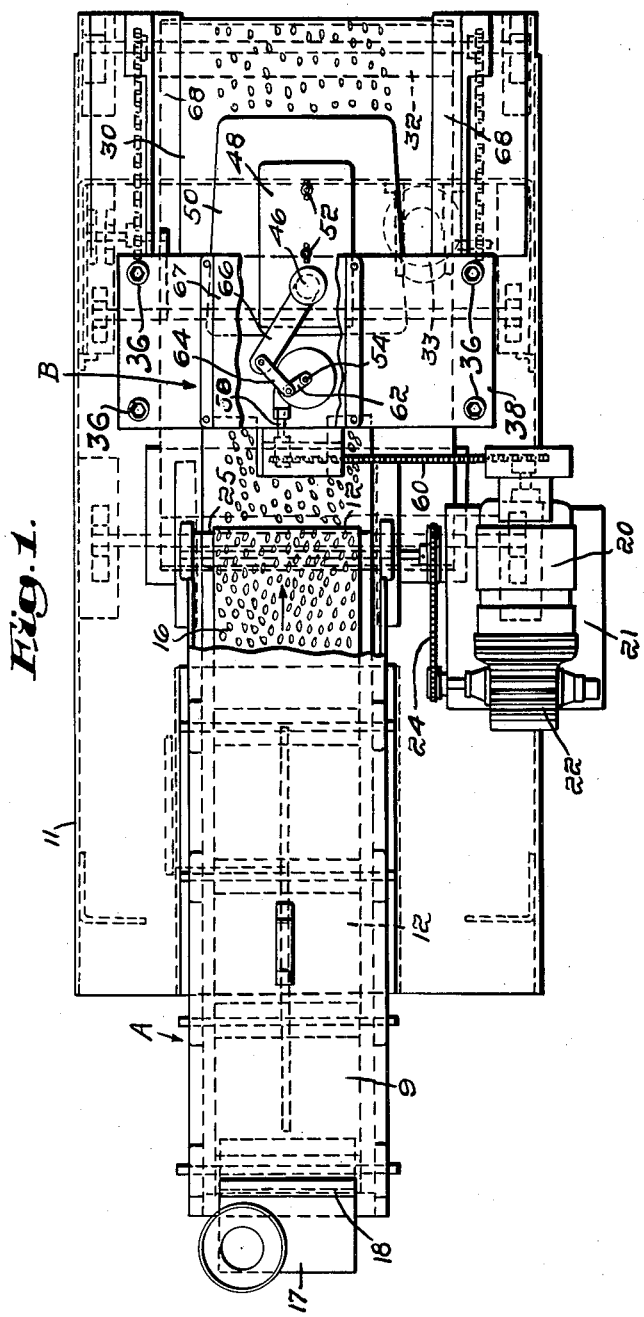
Inventor:
James W. Gardner,
by Kenway, Jenney, Witter & Hildreth
Attorneys

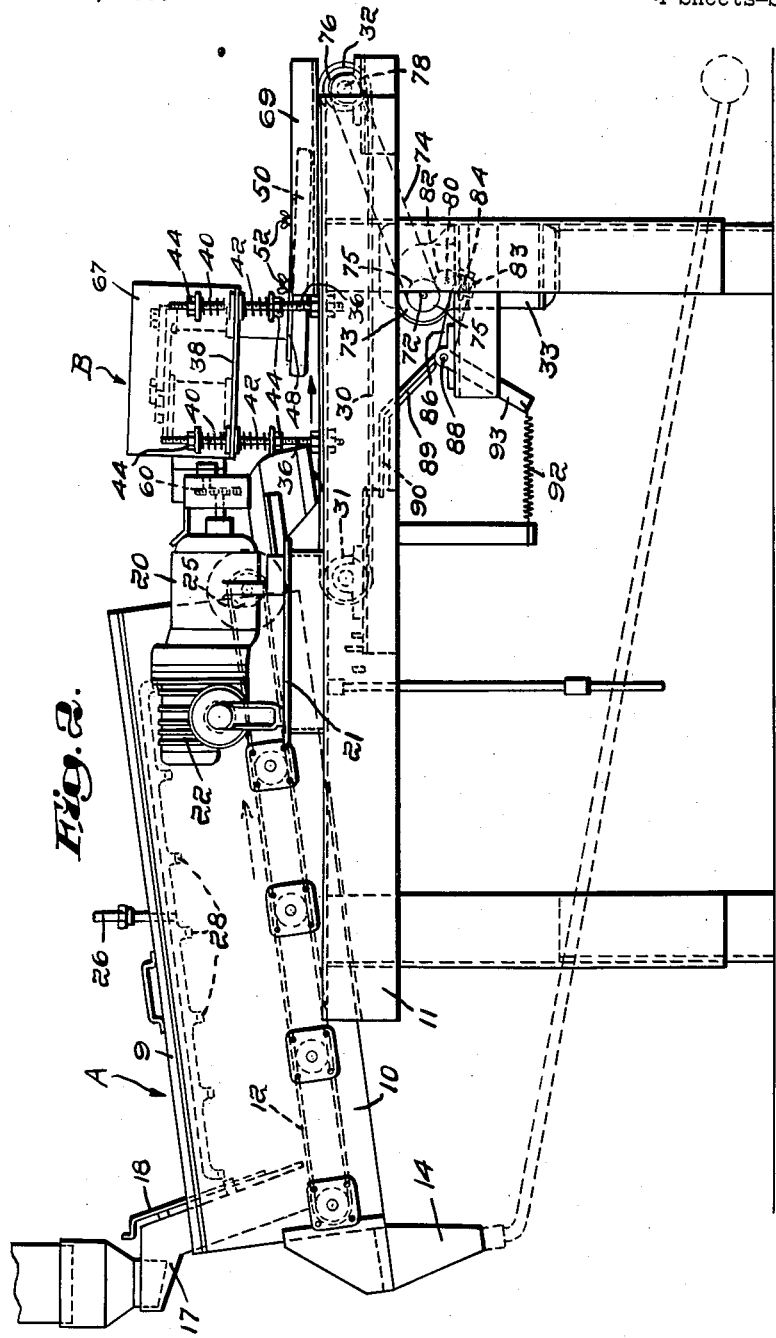

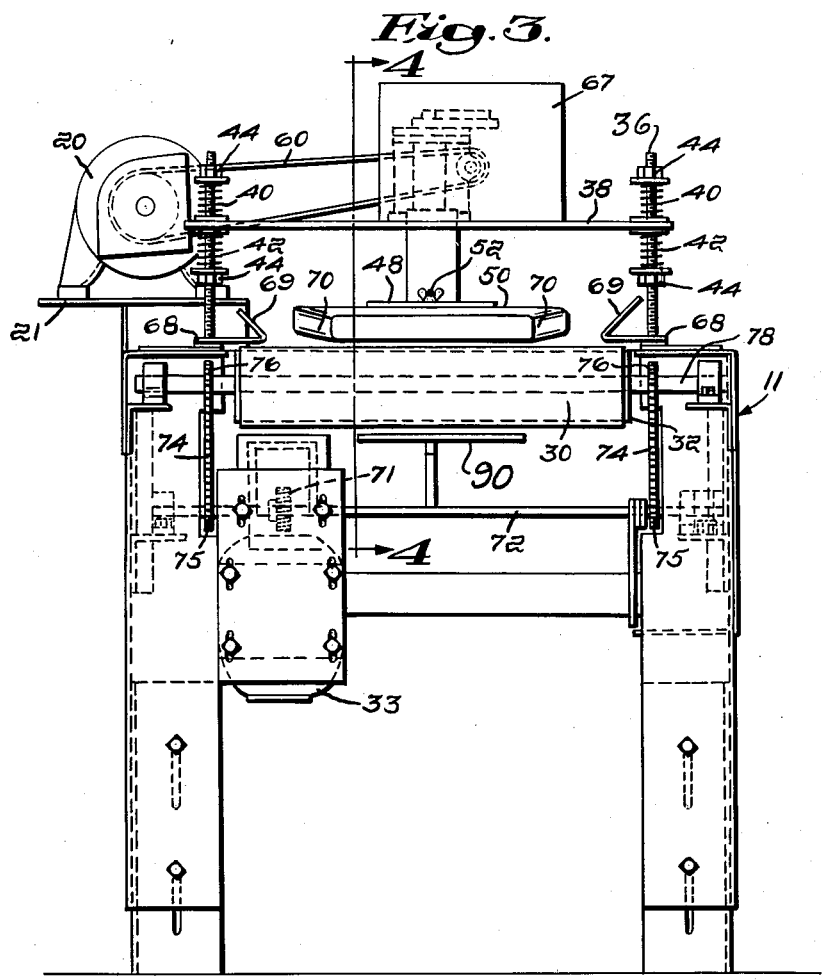

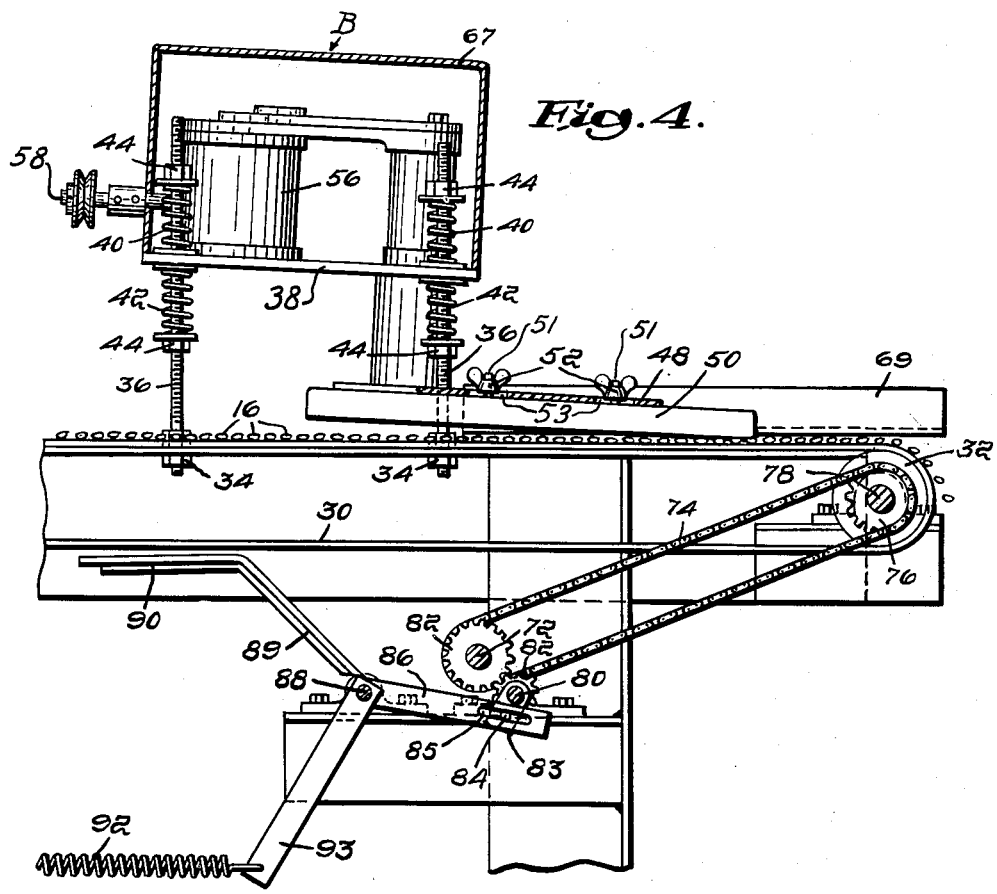

United States Patent Office 2,964,080
Patented Dec. 13, 1960

2,964,080

MACHINE FOR BLANCHING PEANUTS AND THE LIKE

James W. Gardner, 309 Washington Ave., Tyrone, Pa.

Filed Feb. 17, 1958, Ser. No. 715,800

3 Claims. (Cl. 146—32)

This invention relates to improvements in machines for blanching peanuts and the like, that is, removing the skins from shelled nuts. The skins on the shelled nuts are usually first slitted from end to end of the nuts to facilitate their removal and the nuts are then scalded to loosen the skins and thereafter subjected to a frictional rubbing action to remove the skins. It is highly desirable that this action shall be both gentle, and efficient to effect complete removal of the skins without undue breakage of the nuts, since clean and whole nuts command a substantially higher price. The primary object of the invention resides in the production of an improved machine for more efficiently performing this operation and producing a superior product.

My improved machine includes an endless conveyor having a horizontal top reach extending along a predetermined path and adapted to carry nuts thereon along the path, together with a rubbing apron disposed in spaced relation above said reach and adapted frictionally to rub the nuts therebetween and remove the skins. The apron is supported for relative rubbing movement on a bridge disposed above said reach and its gentle action on the nuts is facilitated by resiliently supporting the bridge for adjustment toward and from the reach. Also the apron is preferably slightly inclined downwardly toward the reach in the direction of movement of the reach to trap the nuts between the apron and reach and increase the frictional pressure on the nuts as they travel beneath the apron. The production of an improved machine embodying these novel features comprises a further object of the invention.

A further feature of the invention resides in the production of means disposed to whip against the bottom reach of the conveyor to dislodge and clean loose skins and particles therefrom, thereby further facilitating the production of a clean and whole product.

These and other features of my invention will be more readily understood and appreciated from the following detailed description of a preferred embodiment thereof, selected for purposes of illustration and shown in the accompanying drawings in which:

Fig. 1 is a plan view of a machine embodying the invention,

Fig. 2 is a side elevation,

Fig. 3 is a front end view, and

Fig. 4 is an enlarged fragmentary side elevation of mechanism shown in Fig. 2.

The nut blanching machine illustrated in the drawings comprises a nut scalding portion A and a skin removing portion B. The portion A embodies a tank 10 covered by a hood 9 and supported on a frame 11 to incline upwardly toward the portion B, and an endless woven wire belt conveyor 12 in the bottom of the tank is provided to carry nuts upwardly in the tank to the portion B. A drain 14 extends from the lower end of the tank. Nuts 16 to be treated are deposited into the lower end of the tank through a hopper 17. A gate 18 on the forward side of the hopper extends downwardly to a position adjacent to the conveyor and can be adjusted to permit a predetermined feeding of the nuts from the hopper by the conveyor.

The top reach of the conveyor 12 is slowly moved upward in the direction of the arrows by a motor 20 supported on a platform 21 on the frame. The drive from the motor is through reduction gearing within a housing 22 and includes a chain 24 to a sprocket on the forward end supporting roller 25 of the conveyor. As the top reach moves forwardly it carries nuts thereon beneath the gate 18 at predetermined rate from the hopper and through the tank. A spray pipe 26 with spray nozzles 28 is provided for spraying fresh scalding water onto the nuts to wash them and loosen the skins as they move toward the discharging end of the conveyor. The temperature of the water is automatically regulated to a degree serving the skin loosening function without unduly penetrating or damaging the nuts. The woven wire conveyor permits free passage of the water therethrough and the drain constantly removes this water so that the nuts are continuously treated with a fresh and clean scalding bath.

The skin removing portion B of the machine includes an endless conveyor 30 supported on rollers 31 and 32 on the frame 11 and having a horizontal top reach disposed beneath the discharging end of the conveyor 12 and extending forwardly thereof along the machine, the nuts from the conveyor 12 being discharged onto the conveyor 30. The conveyor 30 is of rubber composition, roughened on its outer nut-carrying surface, and is driven in the direction of the arrow from a motor 33 through connections hereinafter described.

Secured by nuts to the frame 11 outside of the top reach of the conveyor 30 and adjacent to its side margins are two pairs of posts 36 and supported on the posts horizontally above and extending across the conveyor is a plate-like bridge 38. The bridge is supported resiliently on the posts between opposed compression springs 40 and 42 on each post and each spring is backed up by a nut 44 threaded to its post. Thus the bridge is supported resiliently by and between the springs and the resiliency can be adjusted by rotating the eight nuts 44. A shaft 46 is journaled for rotation in the bridge and has a plate 48 fixed to its bottom end. A nut rubbing apron 50 is secured to the bottom face of the plate by wing nuts 52 on bolts 51 carried by the apron. The bolts extend through slots 53 in the plate, thus permitting longitudinal adjustment of the apron on the plate. Such adjustment provides for increasing or decreasing the length of the apron and thereby the extent of its action on the nuts. If a gentle action is required the apron length will be relatively short and if a rougher treatment is required the apron will be lengthened to provide a greater oscillating sweep. The apron is in spaced relation above the top reach and slightly inclined downwardly in the direction of movement of the reach to trap the nuts 16 between the apron and reach, it being apparent that the frictional pressure on the nuts is thus progressively increased as they travel beneath the apron. The required inclination of the shaft 46 and apron 50 is secured by adjusting the nuts 44 to incline the bridge 38 as shown in Figs. 2 and 4. Also as shown in the drawing the shaft 46 is fixed to the rearward end portion of the apron whereby oscillating movement of the shaft oscillates the forward end of the apron freely over the top reach of the conveyor.

The following described mechanism is provided for oscillating the shaft 46 and the apron to effect the rubbing action on the nuts. A shaft 54 journaled vertically in the bridge 38 carries a worm gear thereon within a housing 56. A shaft 58 journaled for rotation on the bridge carries a worm cooperating with the worm gear. The shaft is driven from the motor 20 through a belt or chain 60. A crank 62 on the shaft 54 is connected by a link 64 to an arm 66 on the shaft 46. Thus rotation of the shaft 54 operates through the crank connection to oscillate the shaft 46 and the rubbing apron 50 over the conveyor. The crank mechanism is covered by a housing 67 on and secured to the bridge 38. Nut confining plates 68 are secured to the two foremost posts 36 and have V-shaped inner margins 69 overlapping the marginal edges of the conveyor along and forwardly of the rubbing apron. These plates serve to prevent escape of nuts from the conveyor due to the oscillating action of the rubbing apron. The sides of the apron are somewhat tapered inwardly-forwardly at 70 to provide clearance for the oscillating movement and the slots 53 in the plate 48 permit adjustment varying the operative length of the apron.

A shaft 72 in a housing 73 and journaled in the frame 11 is driven from the motor 33 through a worm on the motor shaft in mesh with a worm wheel 71 on the shaft 72. The conveyor 30 is driven from the shaft 72 through chains 74 extending over sprockets 75 and 76 on the shaft 72 and the shaft 78 of the conveyor roller 32. A secondary shaft 80 driven at increased speed from the shaft 72 through gearing 82 carries an arm 83. A pin 84 on the arm extends into a slot 85 in an arm 86 fixed to a shaft 88. Also fixed to the shaft 88 is a belt slapping arm 89 having a free end portion 90 disposed to engage flatly against the lower reach of the conveyor 30. A tension spring 92 anchored at one end and having its other end connected to the free end of an arm 93 fixed to the shaft 88 normally pivots the shaft in the belt slappin direction. The function of this mechanism is to dislodge skins and particles from the conveyor, thus keeping the conveyor clean and facilitating the production of a superior product.

The operation of the machine is believed apparent. The conveyor 12 deposits the scalded and washed nuts 16 onto the conveyor 30 which carries the nuts beneath the rubbing apron 50. The bottom face of the apron is ordinarily covered with a facing of soft material to facilitate the frictional and gentle engagement of the nuts. The inclined position of the apron provides an open mouth for receiving the nuts therebeneath, as illustrated in Figs. 2 and 4, and as the conveyor carries them along they are engaged between the apron and conveyor with an increasing pressure that, combined with the oscillating movement of the apron, thoroughly and gently removes the skins without breaking the nuts.

As heretofore pointed out, whole and clean nuts command a substantially higher price than nuts containing broken pieces together with fragments of skins and fine broken particles. A primary feature of the invention therefore comprises improved mechanism for removing the skins without breakage of the nuts and cooperating means for keeping the nuts clean. The rubbing apron 50 is supported directly on the bridge 38 and the resilient mounting of this bridge on and between the springs 40 and 42 gives such soft and gentle support to the apron as to preclude nut breakage that would otherwise occur. Also the adjustment provided by the nuts 44 threaded to the posts 36 not only provides for properly inclining and spacing the apron above the conveyor but also such compression of the springs as to produce the desired resilient pressure on the nuts. Nuts with loose and easily removed skins require light resilient pressure, whereas nuts with tough and tight skins require substantially heavier pressure. Thus the nuts are engaged with a cushioning resilience properly adjusted to produce just the necessary pressure required to perform the work in hand. The eight nuts 44 furthermore provide for adjustment of the bridge 38 together with the apron 50 to the inclination required of the apron to trap nuts therebeneath as illustrated in Figs. 2 and 4. It is also noted that the mechanism for oscillating the apron 50 is mounted midway between the ends of the bridge 38, thus distributing the weight evenly on the posts 36.

The rubber conveyor 30 is roughened on its outer face and it will be understood that skins and loose particles may cling to this face during its return passage along the bottom reach. The quality of the product is further facilitated by cleaning the conveyor during such passage. This operation is performed by the slapping arm 89-90 which functions through the mechanism shown in Fig. 4 and above described for rapidly slapping the bottom reach and thus removing all loose debris therefrom before it again receives nuts from the conveyor 12.

Having thus disclosed my invention what I claim as new and desire to secure by Letters Patent is:

1. In a machine for blanching peanuts and the like, a frame, an endless conveyor supported on the frame and having a horizontal top reach extending along a predetermined path and adapted to carry nuts thereon along the path, a bridge, a plurality of vertical posts supported at their lower ends on the frame and extending upwardly therefrom outside of said reach and adjacent to its side margins, compression springs on the posts engaging oposite faces of the bridge at one end of each spring, adjusting nuts threaded to the posts and engaging the other ends of the springs for supporting the bridge horizontally above and for resilient adjustment toward and from said reach, a substantially vertical shaft journaled on the bridge for turning movement about its longitudinal axis, a rubbing apron fixed to the bottom end of the shaft in position frictionally to engage the nuts between the apron and top reach, means for oscillating the shaft and apron to rub the nuts between the apron and reach and remove the skins therefrom, a plate fixed to the bottom end of said shaft, and means securing the apron to and in face to face contact with the plate and including means for adjustment of the apron on the plate longitudinally of said path and relative to the shaft.

2. In a machine for blanching peanuts and the like, a frame, an endless conveyor supported on the frame and having a horizontal top reach extending along a predetermined path and adapted to carry nuts thereon along the path, a bridge, a plurality of vertical posts supported on the frame outside of said reach and adjacent to its side margins, springs and adjusting nuts on the posts for supporting the bridge horizontally above and for resilient adjustment toward and from said reach, a substantially vertical shaft journaled on the bridge for turning movement about its longitudinal axis, a rubbing apron fixed at its rearward portion to the bottom end of the shaft in position leaving the forward portion of the apron free to oscillate about the shaft axis and with the apron slightly inclined downwardly and forwardly toward said reach in the direction of movement of the reach to trap the nuts between the apron and reach and increase the frictional pressure on the nuts as they travel beneath the apron, and means for oscillating the shaft and apron to rub the nuts between the apron and reach and remove the skins therefrom.

3. The machine defined in claim 2 in which the bridge and apron are in fixed and parallel relation and said shaft remains perpendicular thereto in all positions of bridge adjustment.

References Cited in the file of this patent
UNITED STATES PATENTS

| 745,269 | Welch | Nov. 24, 1903 |
| 1,632,124 | Freiberg | June 14, 1927 |
| 2,349,080 | Deck | May 16, 1944 |
| 2,605,797 | Green | Aug. 5, 1952 |

FOREIGN PATENTS

| 564,162 | Germany | Nov. 14, 1932 |